(12) United States Patent
Yan

(10) Patent No.: US 8,390,627 B2
(45) Date of Patent: Mar. 5, 2013

(54) TEXT PROCESSING DEVICE AND TEXT PROCESSING METHOD THEREOF

(75) Inventor: Xu-Xing Yan, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 817 days.

(21) Appl. No.: 12/567,809

(22) Filed: Sep. 28, 2009

(65) Prior Publication Data
US 2010/0309229 A1   Dec. 9, 2010

(30) Foreign Application Priority Data
Jun. 3, 2009  (CN) ............... 2009 1 0302881

(51) Int. Cl.
*G09G 5/26* (2006.01)
*G09G 5/00* (2006.01)

(52) U.S. Cl. ............... 345/472; 345/660
(58) Field of Classification Search ............... None
See application file for complete search history.

(56) References Cited

U.S. PATENT DOCUMENTS
2002/0057281 A1* 5/2002 Moroo et al. ............... 345/668
2009/0264112 A1* 10/2009 De Zen et al. ............... 455/415
2010/0111419 A1* 5/2010 Uehori ............... 382/182

* cited by examiner

*Primary Examiner* — Ryan R Yang
(74) *Attorney, Agent, or Firm* — Altis Law Group, Inc.

(57) ABSTRACT

A text processing device and text processing method are provided. The method includes steps: receiving input characters; displaying current input characters with a predetermined magnification ratio; judging whether length of the input characters is more than the predetermined maximum length, if not, receiving input characters, and if yes, adjusting display state on the text processing device according to the predetermined magnification ratio and the predetermined maximum length.

9 Claims, 6 Drawing Sheets

TEXT PROCESSING DEVICE AND TEXT PROCESSING METHOD THEREOF

BACKGROUND

1. Technical Field

The present disclosure relates to a text processing device and a text processing method thereof.

2. Description of Related Art

Generally, input characters that near a mouse cursor are very small, users have to stare at input characters in order to check correctness when inputting characters, as a result, it usually causes eye fatigue and decreases work efficiency.

BRIEF DESCRIPTION OF THE DRAWINGS

The components in the drawings are not necessarily drawn to scale, the emphasis instead being placed upon clearly illustrating the principles of the text processing device. Moreover, in the drawings, like reference numerals designate corresponding parts throughout the several views.

DETAILED DESCRIPTION

Figure 1:
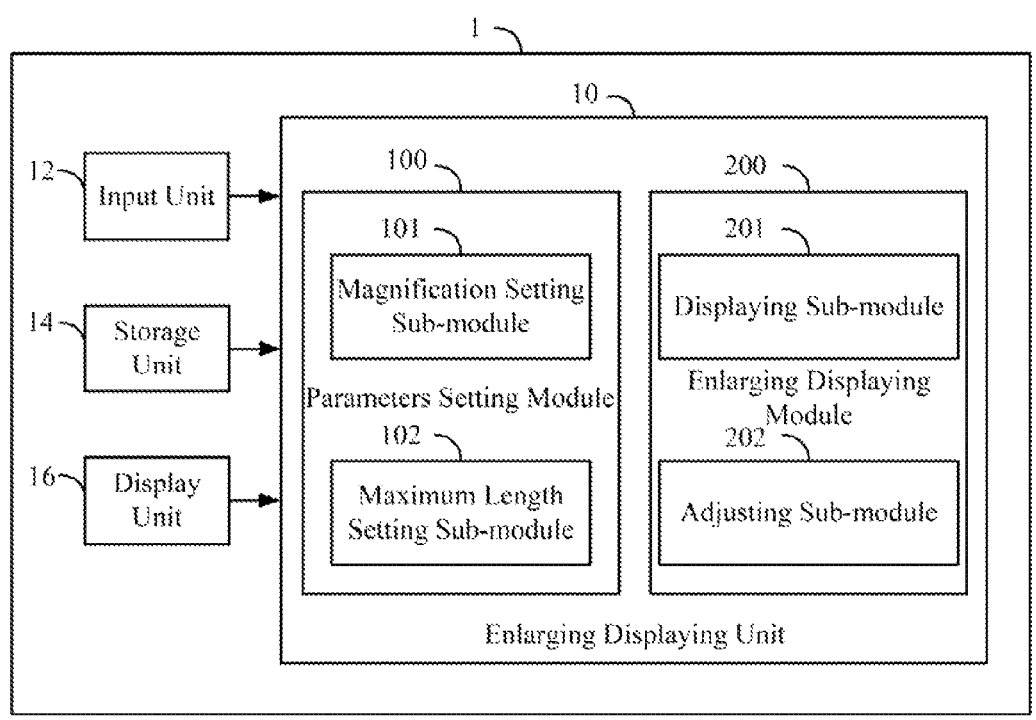
FIG. 1 is a block diagram of a hardware infrastructure of a text processing device, in accordance with an exemplary embodiment.

FIG. 1 is a block diagram of a hardware infrastructure of a text processing device 1, in accordance with an exemplary embodiment. The text processing device 1 may be a computer, a mobile phone, or other electronic device that can be used to input text. The text processing device 1 is configured to input text. The type of the text may be word, character, number and so on. In order to make the present disclosure more easily to understand, character is taken for example to illustrate.

In an exemplary embodiment, the text processing device 1 includes an enlarging display unit 10, an input unit 12, a storage unit 14, and a display unit 16.

The input unit 12 is configured to generate signals in response to user inputs. The storage unit 14 is configured to store data. The data includes a program for enabling the enlarging display unit 10 to enlarge display content, and predetermined parameters, the predetermined parameters include a predetermined magnification ratio and a predetermined maximum length. The display unit 16 is configured to display characters on the text processing device 1.

The enlarging display unit 10 is a programmable unit. The enlarging display unit 10 includes a parameters setting module 100 and an enlarging display module 200.

The parameters setting module 100 is configured to set a magnification ratio of displaying a character to be input, and a maximum length of displaying characters with the magnification ratio. The enlarging display module 200 is configured to display characters according to the predetermined magnification ratio and the predetermined maximum length. When the length of the input characters is more than the predetermined maximum length, the enlarging display module 200 displays the input character(s) which is enlarged to a normal display state, according to the principles of first in first out (FIFO), that is, the enlarging display module 200 displays the character(s) which is enlarged earliest to the normal display state, so as to set aside space to enlarge new input character(s), and thus to keep the length of characters which are enlarged is the maximum length.

The parameters setting module 100 includes a magnification setting sub-module 101 and a maximum length setting sub-module 102. The magnification setting sub-module 101 is configured to set the magnification ratio of displaying a character to be input, and the maximum length setting sub-module 102 is configured to set the maximum length of displaying characters with the magnification ratio.

In another exemplary embodiments, the enlarging display unit 10 does not include the parameters setting module 100. The magnification ratio and the maximum length are system default values.

The enlarging display module 200 includes a displaying sub-module 201 and an adjusting sub-module 202. The displaying sub-module 201 is configured to display current input characters with the predetermined magnification ratio, and the adjusting sub-module 202 is configured to display the character(s) which is enlarged earliest to the normal display state, so as to set aside space to enlarge new input character(s), and thus to keep the length of characters which are enlarged is the maximum length when the length of the input characters is more than the predetermined maximum length.

Figure 2:
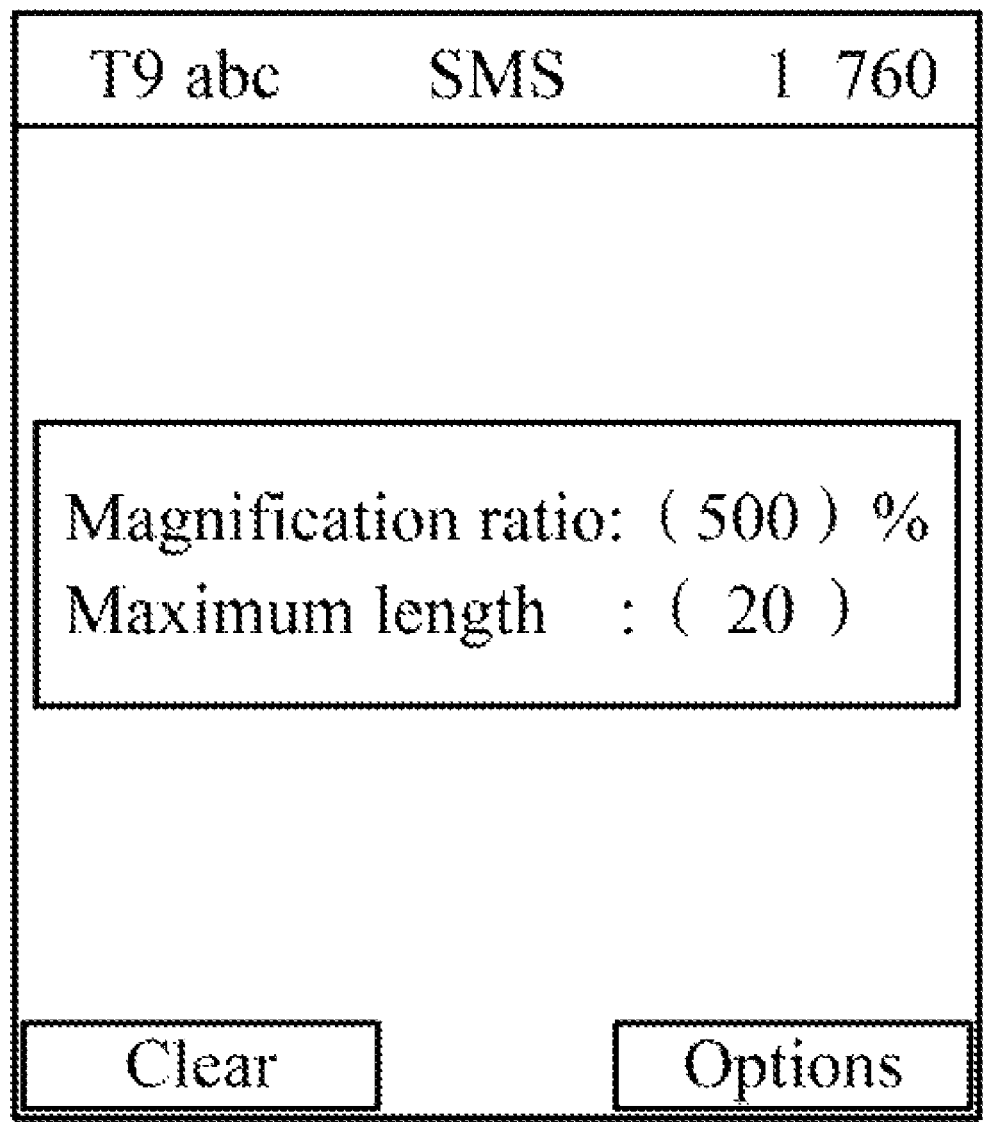
FIG. 2 is a schematic diagram of an interface for setting parameters on the text processing device of FIG. 1, in accordance with an exemplary embodiment.

FIG. 2 is a schematic diagram of an interface for setting parameters on the text processing device of FIG. 1, in accordance with an exemplary embodiment. When the text processing device 1 enters an input state, (e.g., editing a message), the text processing device 1 provides the interface for the user to input the magnification ratio and the maximum length. As shown in FIG. 2, for example, the magnification ratio is set to 500%, and the maximum length of characters is set to 20.

Figure 3:
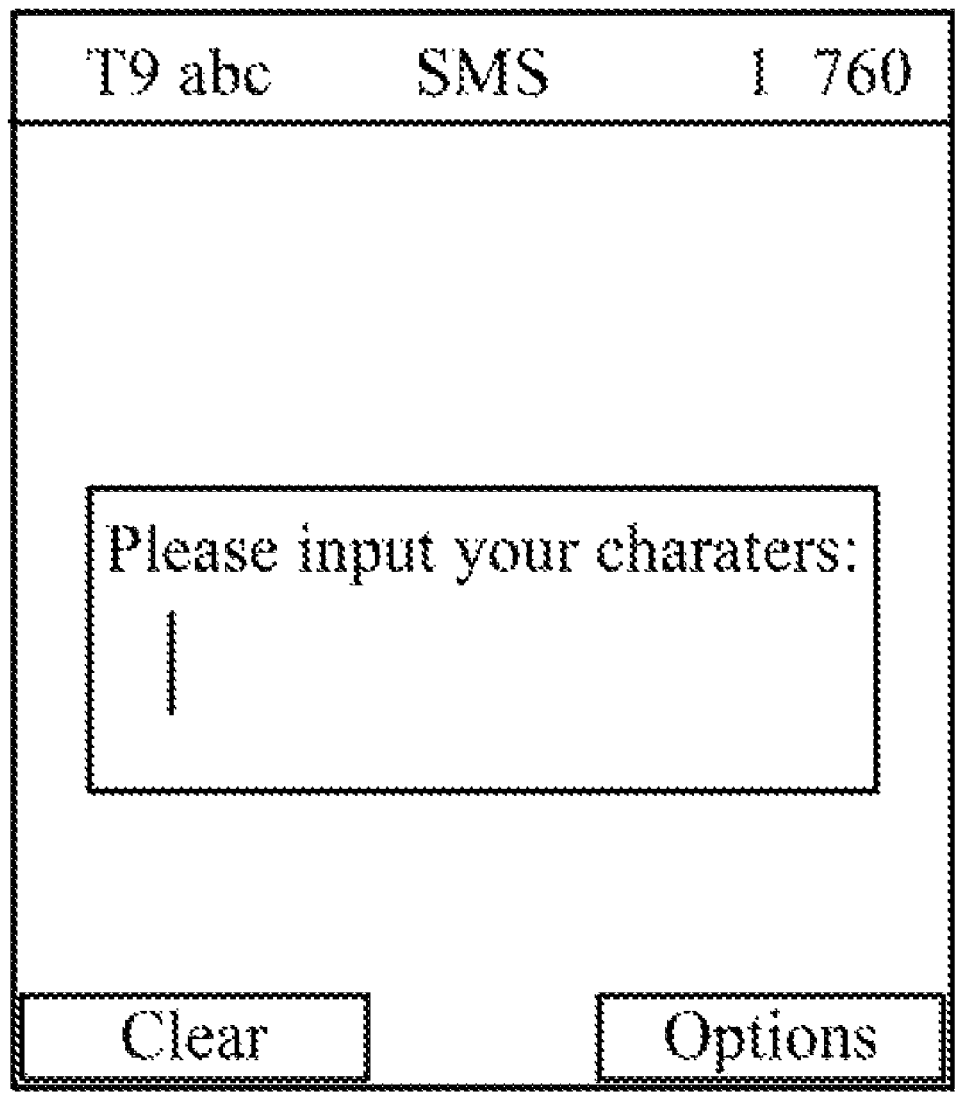
FIG. 3 is a schematic diagram of an interface for inputting characters on the text processing device of FIG. 1, in accordance with an exemplary embodiment.

FIG. 3 is a schematic diagram of an interface for inputting characters on the text processing device of FIG. 1, in accordance with an exemplary embodiment. When finishing setting the parameters, the text processing device 1 further provides another interface as shown in FIG. 3 for the user to input characters. In this interface, it displays a message, such as, "Please input your characters:" to prompt the user to input the characters.

Figure 4:
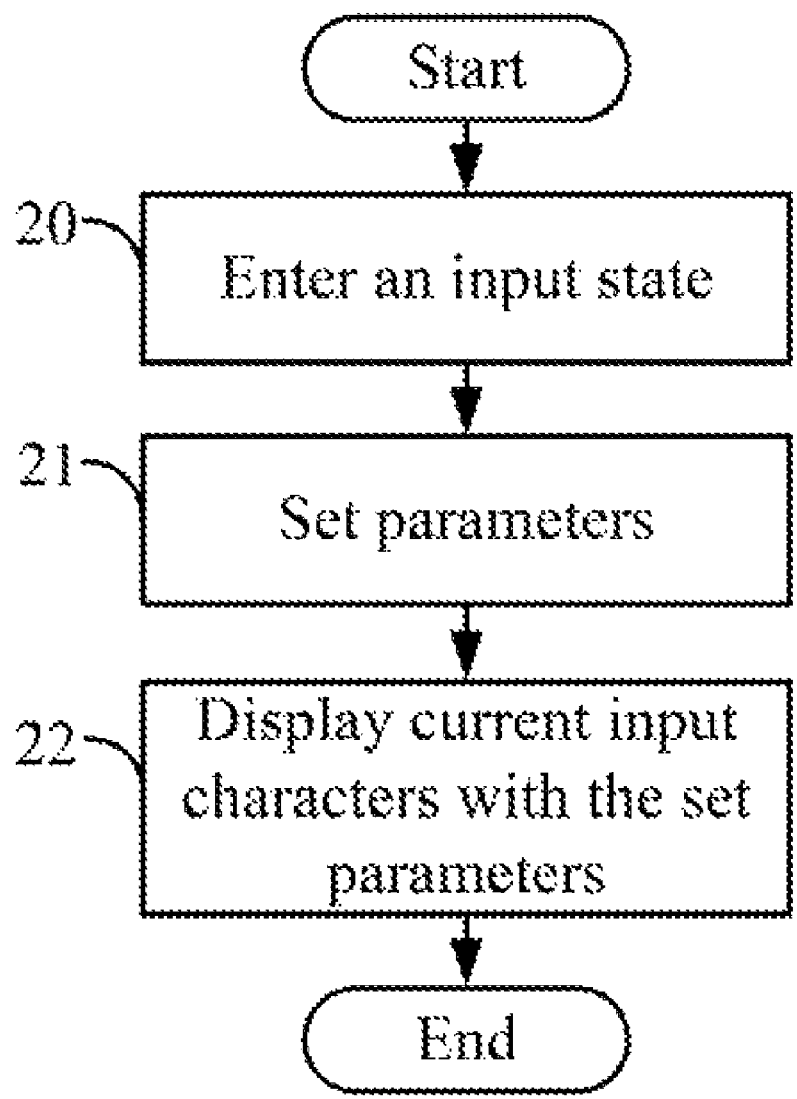
FIG. 4 is a flowchart of using the text processing device of FIG. 1, in accordance with an exemplary embodiment.

FIG. 4 is a flowchart of using the text processing device of FIG. 1, in accordance with an exemplary embodiment. In step 20, the text processing device 1 enters an input state. In step 21, the text processing device 1 provides an interface for the user to input parameters, and the enlarging display module 200 sets the parameters. In step 22, the text processing device 1 displays current input characters according to the set parameters.

Figure 5:
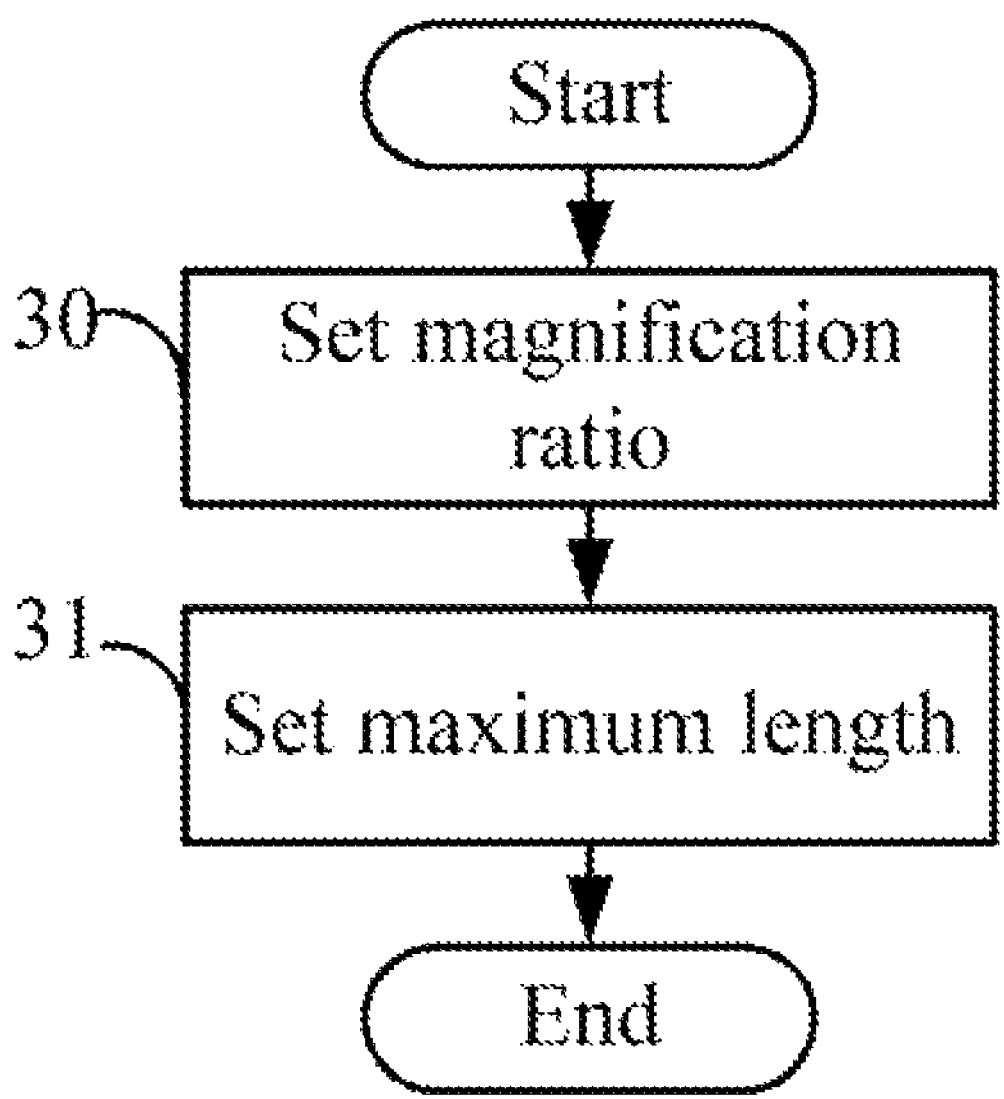
FIG. 5 is a flowchart of setting parameters on the text processing device of FIG. 1, in accordance with an exemplary embodiment.

FIG. 5 is a flowchart of setting parameters on the text processing device of FIG. 1, in accordance with an exemplary embodiment. In step 30, in the interface of setting parameters, the magnification setting sub-module 101 sets the magnification ratio. In step 31, the maximum length setting sub-module 102 sets the maximum length of the characters.

Figure 6:
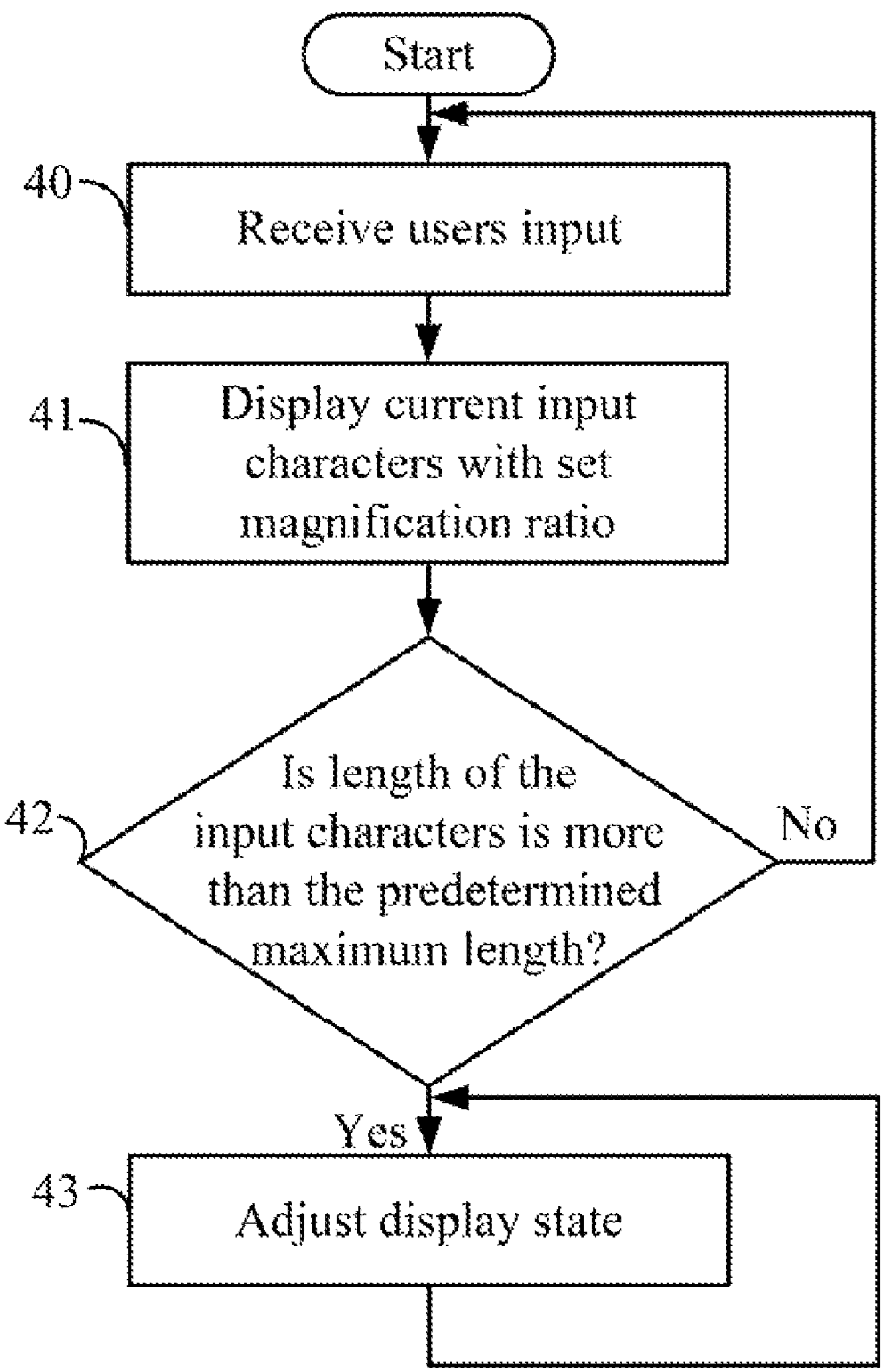
FIG. 6 is a flowchart of text processing method implemented by the text processing device of FIG. 1, in accordance with an exemplary embodiment.

FIG. 6 is a flowchart of text processing method implemented by the text processing device of FIG. 1, in accordance with an exemplary embodiment. In step 40, the text processing device 1 receives the input characters input from the input unit 12. In step 41, the display unit 16 displays the input characters with the predetermined magnification ratio. In step 42, the adjusting sub-module 202 judges whether the length of the input characters is more than the predetermined maximum length. If not, then the procedure returns to step 40; if yes, the procedure goes to step 43. In step 43, the enlarging display module 200 displays the input character(s) which is enlarged to a normal display state, according to the principles of first in first out (FIFO), that is, the enlarging display module 200 displays the character(s) which is enlarged earliest, to the normal display state, so as to set aside space to enlarge new input character(s), and thus to keep the length of characters which are enlarged less than or equal to the maximum length, then the process goes to step 42.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the disclosure.

What is claimed is:

1. A text processing device comprising:
    a storage unit configured to store a predetermined magnification ratio and a predetermined maximum length;
    a display unit configured to display characters to be input; and
    an enlarging display module configured to adjust a display state of the characters according to the predetermined magnification ratio and the predetermined maximum length;
    wherein when a length of the input characters is more than the predetermined maximum length, the enlarging display module displays the input characters which is enlarged to a normal display state, according to the principles of first in first out (FIFO), so as to set aside space to enlarge new input character(s), and thus to keep the length of input characters which are enlarged to be the maximum length.

2. The text processing device as described in claim 1, further comprising a displaying sub-module, configured to display current input characters with the predetermined magnification ratio.

3. The text processing device as described in claim 1, further comprising an adjusting sub-module, configured to display the character(s) which is enlarged earliest to the normal display state, so as to set aside space to enlarge new input character(s), and thus to keep the length of characters which are enlarged to be the maximum length when the length of the input characters is more than the predetermined maximum length.

4. The text processing device as described in claim 1, further comprising a magnification setting sub-module, configured to set the magnification ratio of displaying a character to be input.

5. The text processing device as described in claim 1, further comprising a maximum length setting sub-module, configured to set the maximum length of displaying characters with the magnification ratio.

6. A text processing method used in a text processing device, the method comprising:
    receiving input characters;
    displaying current input characters with a predetermined magnification ratio;
    judging whether length of the input characters is more than the predetermined maximum length, if not, receiving input characters, and if yes, adjusting display state on the text processing device according to the predetermined magnification ratio and the predetermined maximum length.

7. The method as described in claim 6, the method further comprising:
    when the length of the input characters is more than the predetermined maximum length, displaying the input character(s) which is enlarged via an enlarging display module, to a normal display state, according to the principles of first in first out (FIFO), so as to set aside space to enlarge new input character(s), and thus to keep the length of characters which are enlarged less than or equal to the maximum length.

8. The method as described in claim 6, the method further comprising:
    setting the magnification ratio.

9. The method as described in claim 6, the method further comprising:
    setting the maximum length.

* * * * *